US012113286B2

(12) United States Patent
Hu

(10) Patent No.: US 12,113,286 B2
(45) Date of Patent: Oct. 8, 2024

(54) HIGH-GAIN LOW-PROFILE CIRCULARLY POLARIZED ANTENNA

(71) Applicant: Nan Hu, Irvince, CA (US)

(72) Inventor: Nan Hu, Irvince, CA (US)

( * ) Notice: Subject to any disclaimer, the term of this patent is extended or adjusted under 35 U.S.C. 154(b) by 0 days.

(21) Appl. No.: 18/589,375

(22) Filed: Feb. 27, 2024

(65) Prior Publication Data

US 2024/0250450 A1 Jul. 25, 2024

Related U.S. Application Data

(63) Continuation of application No. PCT/CN2022/095731, filed on May 27, 2022.

(30) Foreign Application Priority Data

Aug. 27, 2021 (CN) ........................ 202110998101.2

(51) Int. Cl.

| | |
|---|---|
| ***H01Q 21/26*** | (2006.01) |
| ***H01Q 9/04*** | (2006.01) |
| ***H01Q 21/06*** | (2006.01) |
| ***H01Q 21/24*** | (2006.01) |

(52) U.S. Cl.

CPC ......... *H01Q 21/065* (2013.01); *H01Q 9/0428* (2013.01); *H01Q 21/24* (2013.01)

(58) Field of Classification Search

CPC ........................... H01Q 21/065; H01Q 9/0428

See application file for complete search history.

(56) References Cited

U.S. PATENT DOCUMENTS

| | | | | |
|---|---|---|---|---|
| 6,366,254 B1 | 4/2002 | Sievenpiper et al. | | |
| 11,271,319 B2* | 3/2022 | Celik | ....................... | H01Q 1/38 |
| 2018/0191073 A1* | 7/2018 | Celik | ....................... | H01Q 5/40 |

FOREIGN PATENT DOCUMENTS

| | | | |
|---|---|---|---|
| CN | 105958196 A | 9/2016 | |
| CN | 106025563 A | 10/2016 | |
| CN | 106410416 A | 2/2017 | |
| CN | 108521024 * | 9/2018 | ............ H01Q 21/06 |

(Continued)

OTHER PUBLICATIONS

The first search report of priority CN application No. 202110998101.2 issued on Feb. 21, 2022.

(Continued)

*Primary Examiner* — David E Lotter

(74) *Attorney, Agent, or Firm* — THE SUN IP LAW

(57) ABSTRACT

The present disclosure relates to a technical field of antennas for communication. Disclosed is a high-gain low-profile circularly polarized antenna. The antenna includes a circularly polarized patch, a composite dielectric high-impedance surface array, and a metal backplate. The circularly polarized patch includes a patch dielectric layer, wherein a first fan-shaped patch, a second fan-shaped patch, a third fan-shaped patch, and a fourth fan-shaped patch are formed on an upper surface of the patch dielectric layer; four coaxial feeding lines are arranged at positions that are close to a center of the patch dielectric layer; and an upper end of each of the coaxial feeding lines is electrically connected to one corresponding fan-shaped patch, and the other end of the each of the coaxial feeding lines penetrates the patch dielectric layer to extend to an outside of a lower surface of the patch dielectric layer.

10 Claims, 14 Drawing Sheets

(56) References Cited

FOREIGN PATENT DOCUMENTS

| | | | |
|---|---|---|---|
| CN | 108521024 | A | 9/2018 |
| CN | 109167184 | A | 1/2019 |
| CN | 111180880 | A | 5/2020 |
| CN | 210926317 | U | 7/2020 |
| CN | 112072283 | A | 12/2020 |
| CN | 113036459 | A | 6/2021 |
| CN | 113690593 | A | 11/2021 |
| CN | 215989233 | U | 3/2022 |
| KR | 20090028355 | A | 3/2009 |

OTHER PUBLICATIONS

International Search Report of International Application No. PCT/CN2022/095731 dated Aug. 17, 2022.
Behrouz Babakhani et al. "Wideband Circularly Polarized Fan-Shaped Antenna On a HIS Structure" 2016 IEEE International Symposium on Antennas and Propagation (APSURSI) Oct. 27, 2016 (Oct. 27, 2016). chapters 1-2.

* cited by examiner

HIGH-GAIN LOW-PROFILE CIRCULARLY POLARIZED ANTENNA

CROSS-REFERENCE TO RELATED APPLICATION

The present disclosure is a continuation application of International Patent Application No. PCT/CN2022/095731, which is filed on May 27, 2022 and claims priority to Chinese patent application Ser. No. 20/211,0998101.2, filed to the China National Intellectual Property Administration on Aug. 27, 2021 and entitled "High-Gain Low-Profile Circularly Polarized Antenna", the disclosure of which is hereby incorporated by reference in its entirety.

TECHNICAL FIELD

The present disclosure relates to a technical field of antennas for communication, and in particular to a high-gain low-profile circularly polarized antenna.

BACKGROUND

As a front-end component for effectively transmitting and receiving the electromagnetic wave in a wireless communication system, an antenna is mainly used for completing mutual conversion between the electromagnetic wave and guided wave, and antenna performance directly affects the communication effect of the whole system. There are various types of antennas. For the communication systems in different application environments, it is necessary to select the appropriate antenna structure and radiation performance that meets technical requirements of the system.

Whether in civilian or military applications, the demands for mobility, flexibility, and integration of the communication systems are increasingly high. A low-profile antenna is favored in the application of modern wireless communication systems due to its characteristics of being low in wind resistance, low in profile, and conformal with a carrier easily. In civilian applications, various mobile carriers, such as vehicles, aircraft, and ships need to deploy the communication system, and the low-profile antenna can achieve conformal deployment with the carrier on the basis of maintaining an original structure of the carrier, which undoubtedly greatly reduces the deployment cost and difficulty of the communication system. In addition, the wind load area of the low-profile antenna is very low, which may reduce strength requirements of towers of modern communication base stations, reduce the cost of construction, and facilitate installation and transportation of the communication system. The low-profile structure effectively accelerates a deployment speed of the communication system.

A micro-strip antenna is a classical antenna structure that has been widely used in various fields. The conventional micro-strip antenna consists of a top micro-strip patch, a middle dielectric layer, and a bottom metal ground, which is usually fed by a micro-strip line or a coaxial line. The metal ground may be regarded as an ideal electrical wall that produces a 180° phase reversal when the electromagnetic wave is incident. In order to maximize the gain, a distance between the metal ground and the micro-strip patch is approximately a quarter of the operating wavelength. Because a back radiation of the top micro-strip patch is reflected by the metal ground and then returns to the original position, after a wave path of half a wavelength and the 180° phase reversal, it is just superposed with a forward radiation of the top micro-strip patch in the same direction. However, at relatively low operating frequencies, the quarter wavelength is often relatively large, resulting in a relatively high profile of this type of antenna, being unable to be used in some environments, and being limited in the application range. In this regard, a high-impedance surface is often used instead of a conventional metal ground. The high-impedance surface is an artificial superstructure that can achieve in-phase reflection of the electromagnetic wave. In this way, the distance between the micro-strip patch and the high-impedance surface may be much less than a quarter of the operating wavelength, thereby reducing the antenna profile. However, in the related technology, the low-profile micro-strip antenna based on the high-impedance surface tends to have better gain characteristics only at a center frequency, and in other frequency bands, the gain attenuation of the antenna is fast. In other words, the gain of this type of antenna is not stable enough in the operating frequency band and is greatly affected by the frequency. In addition, the low-profile micro-strip antenna based on the high-impedance surface reported in the related papers tends to be single linear polarization, while the circularly polarized antenna is rarely reported.

SUMMARY

The technical problem to be solved by some embodiments of the present disclosure is how to provide a high-gain low-profile circularly polarized antenna with stable gain performance in an operating frequency band.

In order to solve the above technical problem, the technical solution adopted in the present disclosure is that: a high-gain low-profile circularly polarized antenna includes a circularly polarized patch at a top, a composite dielectric high-impedance surface array in a middle, and a metal backplate at a bottom.

In some embodiments, the circularly polarized patch includes a patch dielectric layer, wherein a first fan-shaped patch, a second fan-shaped patch, a third fan-shaped patch, and a fourth fan-shaped patch are formed on an upper surface of the patch dielectric layer, and the first fan-shaped patch, the second fan-shaped patch, the third fan-shaped patch, and the fourth fan-shaped patch are not in contact with each other. Four coaxial feeding lines are arranged at positions that are close to a center of the patch dielectric layer, each of the coaxial feeding lines is vertically arranged, an upper end of the each of the coaxial feeding lines is electrically connected to one corresponding fan-shaped patch, and the other end of the each of the coaxial feeding lines penetrates the patch dielectric layer to extend to an outside of a lower surface of the patch dielectric layer.

In some embodiments, the composite dielectric high-impedance surface array includes a composite dielectric layer, a plurality of circular metal patches located on an upper surface of the composite dielectric layer and a plurality of plated through holes. Four circular holes are formed in positions that are close to a center of the composite dielectric layer, and the four circular holes penetrate the composite dielectric layer. Each of the plurality of circular metal patches corresponds to one plated through hole of the plated through holes, an upper end of each of the plated through holes is connected to a corresponding circular metal patch of the circular metal patches, and a lower end of the each of the plated through holes is connected to the metal backplate after passing through the composite dielectric layer.

In some embodiments, the composite dielectric layer includes a third dielectric material layer at a lower side, a second dielectric material layer in a middle, and a first dielectric material layer at an upper side.

In some embodiments, the each of the circular metal patches, a part of the composite dielectric layer at a lower side of the each of the circular metal patches, a part of the metal backplate at a lower side of the composite dielectric layer, and the each plated through hole constitute one composite dielectric high-impedance surface unit, a number of the composite dielectric high-impedance surface unit is multiple. A third dielectric material layer is formed on an upper surface of the metal backplate, a second dielectric material layer is formed on an upper surface of the third dielectric material layer, a first dielectric material layer is formed on an upper surface of the second dielectric material layer, the circular metal patches are formed on an upper surface of the first dielectric material layer, and the each of the circular metal patches and the metal backplate are interconnected through a corresponding plated through hole of the plated through holes penetrating the first dielectric material layer, the second dielectric material layer, and the third dielectric material layer.

In some embodiments, a diameter of the each of the circular metal patches in each composite dielectric high-impedance surface unit is less than a diameter of the first dielectric material layer, and diameters of the metal backplate, the first dielectric material layer, the second dielectric material layer, and the third dielectric material layer in the each composite dielectric high-impedance surface unit are equal.

The beneficial effects generated by adopting the above technical solution are that: the antenna in some embodiments of the present disclosure adopts a coherent phase feeding mode of 0°, 90°, 180°, and 270°, which may ensure a stable phase relationship between radiation patches and is conducive to achieve a relatively large axial ratio bandwidth; through the adoption of the composite dielectric high-impedance surface array, the antenna profile is far lower than a quarter of the operating wavelength, and the antenna maintains stable gain characteristics in the operating frequency band; the antenna in some embodiments of the present disclosure has the advantages of being simple and compact in structure, simple in design process, low in profile, light in weight, and conformal with the structure of the wireless communication system conveniently; and the antenna in some embodiments of the present disclosure is of a micro-strip structure, with mature machining technology, high reliability, and wide application range.

BRIEF DESCRIPTION OF THE DRAWINGS

The present disclosure is elaborated in detail below with reference to the drawings and specific implementations.

Herein: 1, Circularly polarized patch; 101, First fan-shaped patch; 102, Second fan-shaped patch; 103, Third fan-shaped patch; 104, Fourth fan-shaped patch; 105, Coaxial feeding line; 106, Patch dielectric layer; 2, Composite dielectric high-impedance surface array; 201, Circular metal patch; 202, First dielectric material layer; 203, Second dielectric material layer; 204, Third dielectric material layer; 205, Plated through hole; 206, Circular opening; 3, Metal backplate; 301, Annular support column; 4, Composite dielectric high-impedance surface unit.

DETAILED DESCRIPTION OF THE EMBODIMENTS

The technical solutions in the embodiments of the present disclosure will be clearly and completely described in conjunction with the drawings in the embodiments of the present disclosure. It is apparent that the described embodiments are only a part of the embodiments of the present disclosure, and not all of them. All other embodiments obtained by those of ordinary skill in the art based on the embodiments of the disclosure without creative efforts are within the scope of protection of the present disclosure.

In the following description, many specific details are described in order to fully understand the present disclosure, but the present disclosure may also be implemented in other ways different from those described here, and those skilled in the art may make similar extensions without departing from the meaning of the present disclosure. Therefore, the present disclosure is not limited by the specific embodiments disclosed below.

Figure 1:
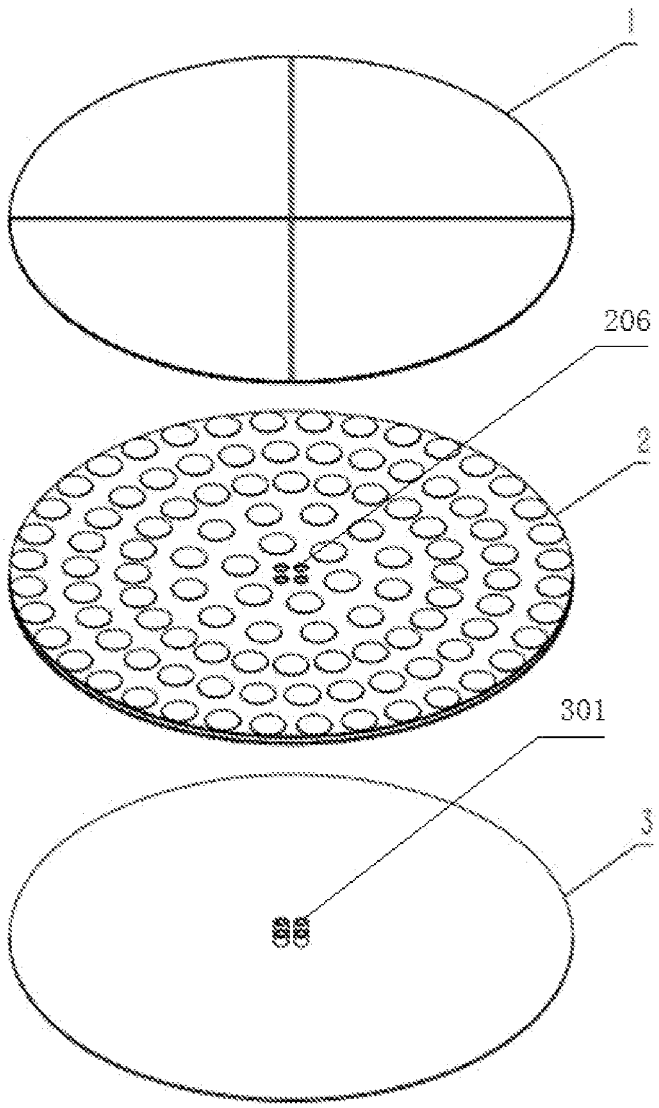
FIG. 1 is a schematic diagram of a decomposed structure of a polarized antenna in an embodiment of the present disclosure.

As shown in FIG. 1, an embodiment of the present disclosure discloses a high-gain low-profile circularly polarized antenna, which includes a circularly polarized patch 1 at a top, a composite dielectric high-impedance surface array 2 in a middle, and a metal backplate 3 at a bottom.

In some embodiments, as shown in FIGS. 3*a* to 3*e*, the circularly polarized patch 1 includes a patch dielectric layer 106. The manufacturing material of the patch dielectric layer 106 may be made of materials in an existing technology, and the patch dielectric layer 106 may be circular or triangular. A first fan-shaped patch 101, a second fan-shaped patch 102, a third fan-shaped patch 103, and a fourth fan-shaped patch 104 are formed on an upper surface of the patch dielectric layer 106, and the first fan-shaped patch 101, the second fan-shaped patch 102, the third fan-shaped patch 103, and the fourth fan-shaped patch 104 are not in contact with each other, so that every two of them cannot be connected into a whole, and the fan-shaped patches have a same overall structure. Four coaxial feeding lines 105 are arranged at positions that are close to a center of the patch dielectric layer 106, each of the coaxial feeding lines 105 is vertically arranged, an upper end of the each of the coaxial feeding lines 105 is electrically connected to one corresponding fan-shaped patch, and the other end of the each of the coaxial feeding lines 105 penetrates the patch dielectric layer 106 to extend to an outside of a lower surface of the patch dielectric layer 106. In some embodiments, the whole circularly polarized patch is circular, and certainly may be in other shapes, such as a triangle.

In some embodiments, as shown in FIGS. 4*a* to 4*e*, the composite dielectric high-impedance surface array 2 includes a composite dielectric layer and a plurality of circular metal patches 201 located on an upper surface of the composite dielectric layer. The circular metal patches 201 may be regularly distributed on the upper surface of the composite dielectric layer, and the circular metal patches 201 are not in contact with each other. Four circular holes 206 are formed in positions that are close to a center of the composite dielectric layer, and the four circular holes 206 penetrate the composite dielectric layer. Each of the circular metal patches 201 corresponds to one plated through hole 205, there are multiple plated through holes 205, wherein an upper end of each plated through hole 205 is connected to a corresponding circular metal patch 201, and a lower end of the each plated through hole 205 is connected to the metal backplate 3 after passing through the composite dielectric layer. In addition, it is to be noted that a specific shape of the metal patch may also be other shapes, such as a triangle.

In some embodiments, the composite dielectric layer includes a third dielectric material layer 204 at a lower side, a second dielectric material layer 203 in the middle, and a first dielectric material layer 202 at an upper side. It is to be noted that the specific number of the dielectric material layers in the composite dielectric layer may also be four, five or more. In addition, the first dielectric material layer 202, the second dielectric material layer 203, and the third dielectric material layer 204 may be made of materials in the existing technology, which will not be elaborated herein.

In some embodiments, as shown in FIGS. 6*a* to 6*e*, each of the circular metal patches 201, a part of the composite dielectric layer at a lower side of the each of the circular metal patches 201, a part of the metal backplate 3 at a lower side of the composite dielectric layer, and a corresponding plated through hole 205 constitute a composite dielectric high-impedance surface unit, the circularly polarized antenna includes a plurality of composite dielectric high-impedance surface units. A third dielectric material layer 204 is formed on an upper surface of the metal backplate 3, a second dielectric material layer 203 is formed on an upper surface of the third dielectric material layer 204, a first dielectric material layer 202 is formed on an upper surface of the second dielectric material layer 203, the circular metal patches 201 is formed on an upper surface of the first dielectric material layer 202, and the each of the circular metal patches 201 and the metal backplate 3 are interconnected through the corresponding plated through hole 205 penetrating the first dielectric material layer 202, the second dielectric material layer 203, and the third dielectric material layer 204.

Figure 6A:
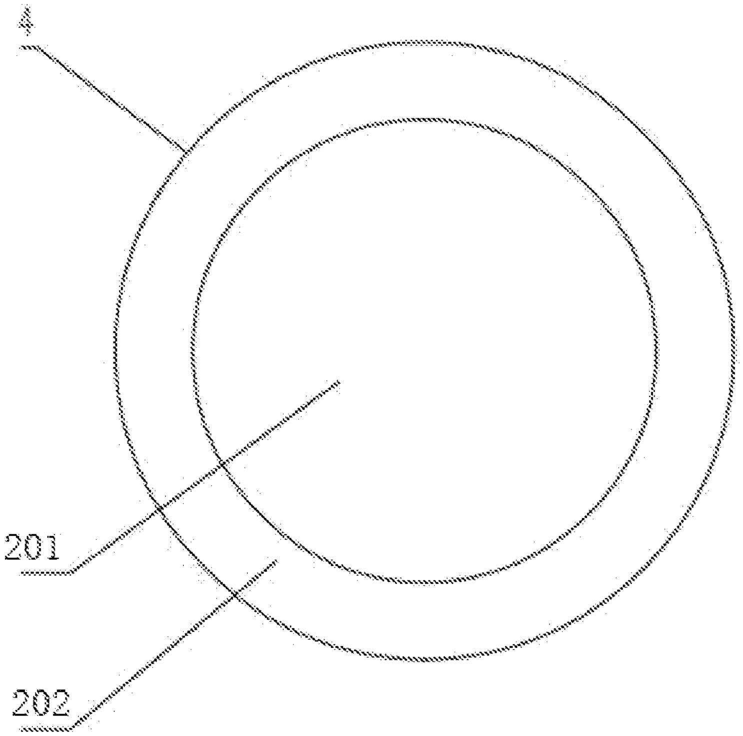
FIGS. 6*a* to 6*d* are schematic structural diagrams of a composite dielectric high-impedance surface unit in a polarized antenna according to an embodiment of the present disclosure.
Figure 6B:
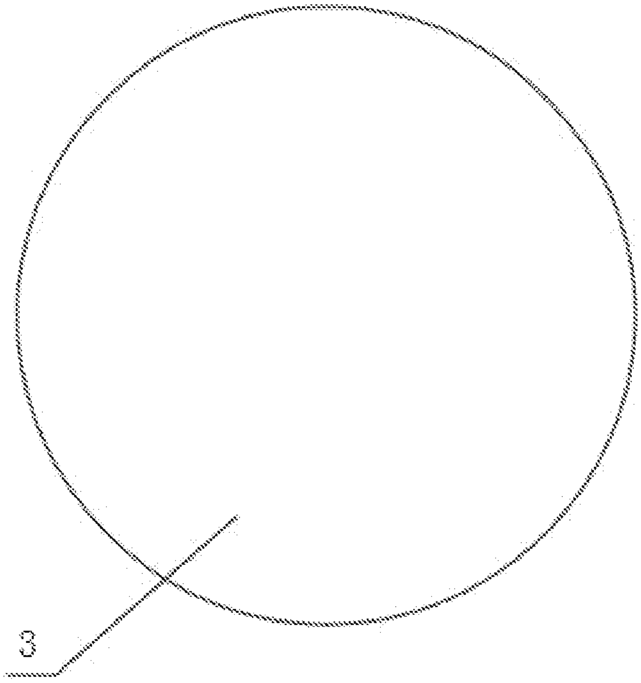
Figure 6C:
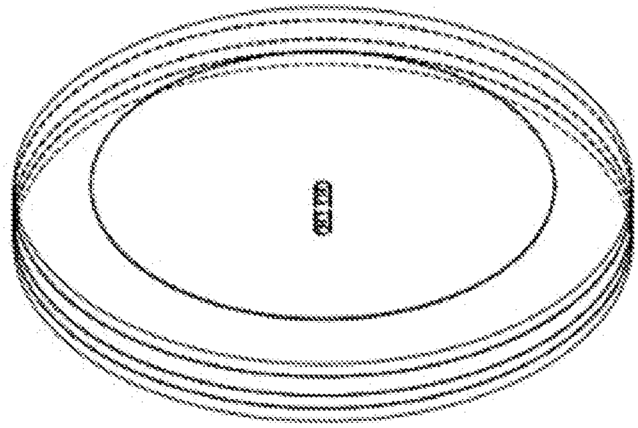
Figure 6D:
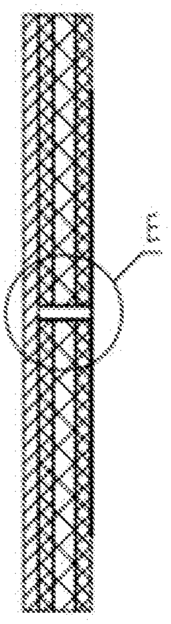
Figure 6E:
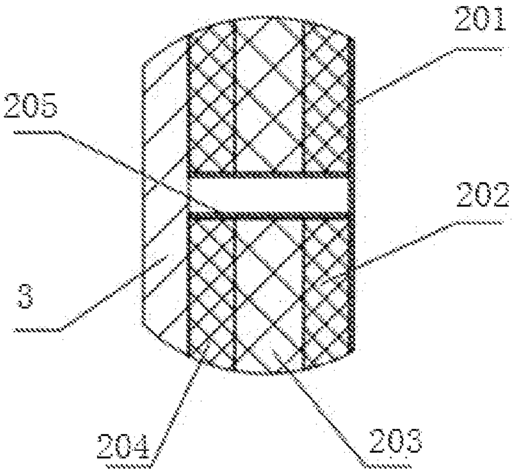
FIG. 6*e* is a schematic diagram of an enlarged structure of a part E in FIG. 6*d*.

In some embodiments, as shown in FIG. 6*c*, a diameter of the circular metal patch 201 in each of the composite dielectric high-impedance surface units is less than a diameter of the first dielectric material layer 202, and diameters of the metal backplate 3, the first dielectric material layer 202, the second dielectric material layer 203, and the third dielectric material layer 204 in the each of the composite dielectric high-impedance surface units are equal.

Figure 2A:
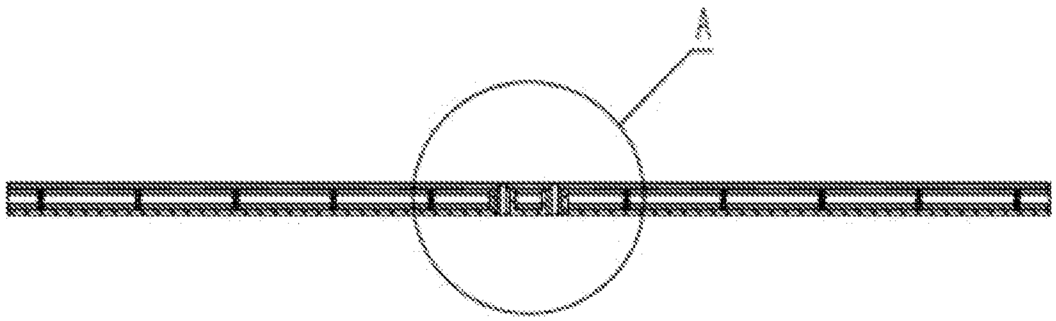
FIG. 2*a* is a schematic diagram of a cross-sectional structure of a polarized antenna according to an embodiment of the present disclosure.
Figure 2B:
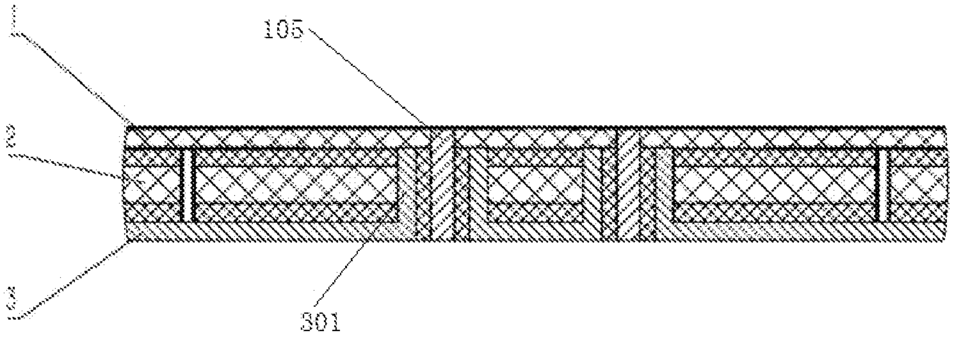
FIG. 2*b* is a schematic diagram of an enlarged structure of a part A in FIG. 2*a*.
Figure 3A:
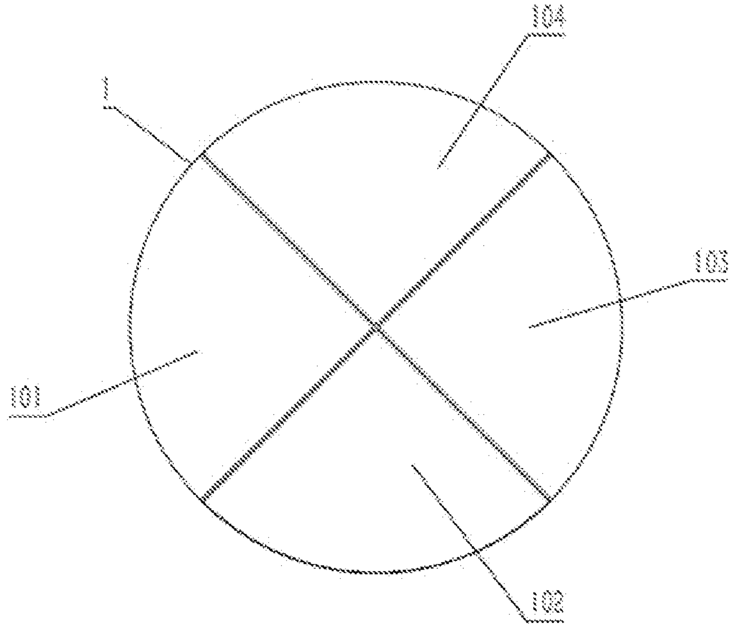
FIGS. 3*a* to 3*d* are schematic structural diagrams of a circularly polarized patch in a polarized antenna according to an embodiment of the present disclosure.
Figure 3B:
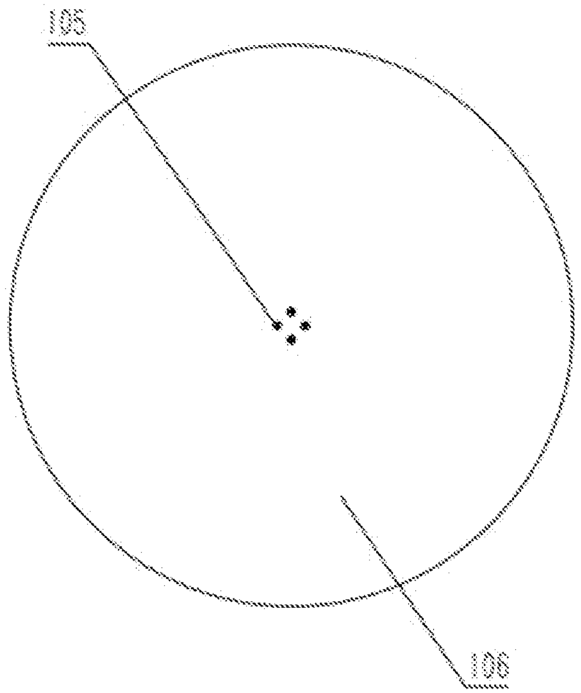
Figure 3C:
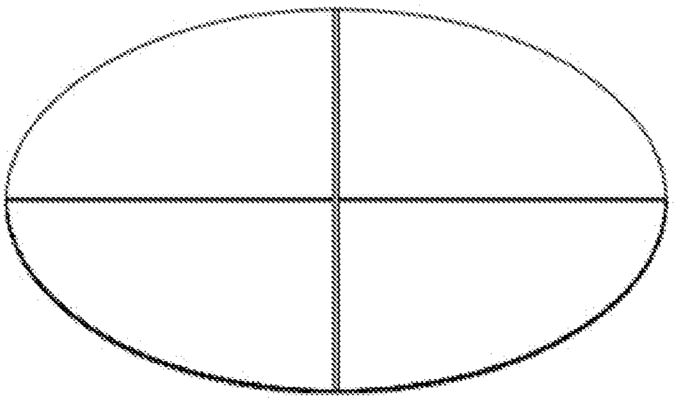
Figure 3D:
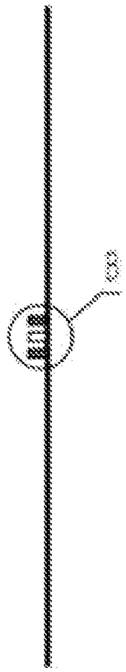
Figure 3E:
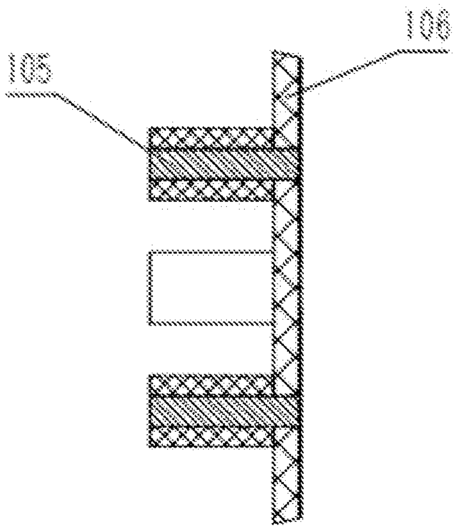
FIG. 3*e* is a schematic diagram of an enlarged structure of a part B in FIG. 3*d*.
Figure 4A:
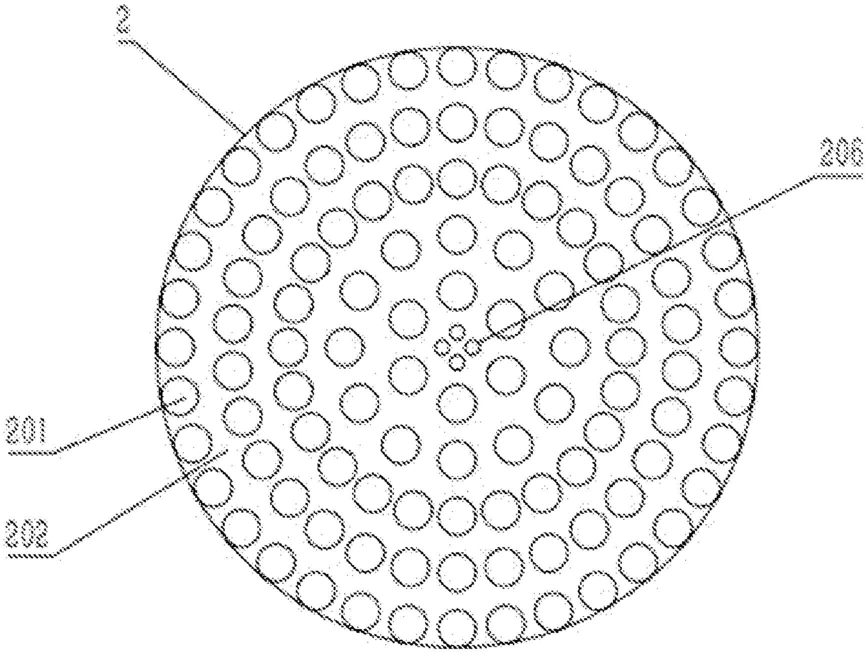
FIGS. 4*a* to 4*d* are schematic structural diagrams of a composite dielectric high-impedance surface array in a polarized antenna according to an embodiment of the present disclosure.
Figure 4B:
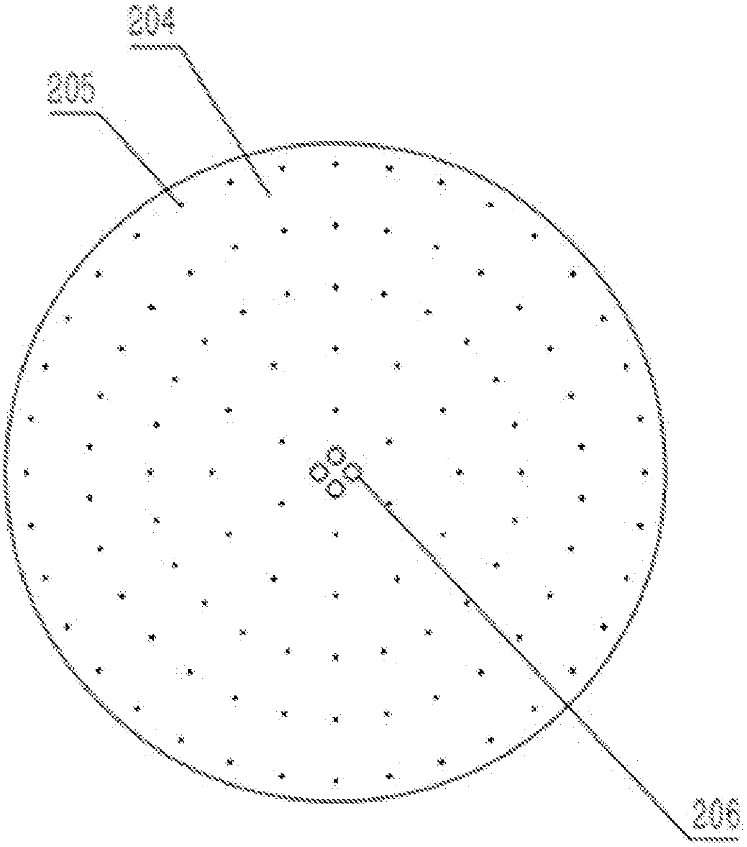
Figure 4C:
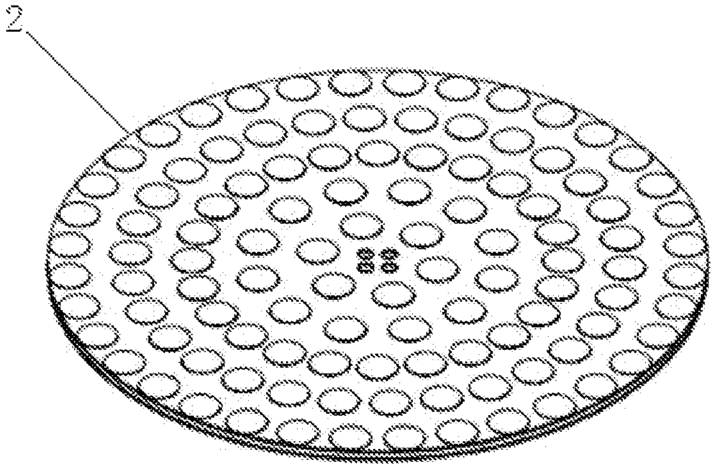
Figure 4D:
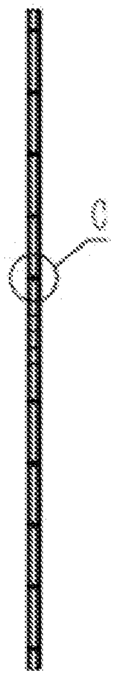
Figure 4E:
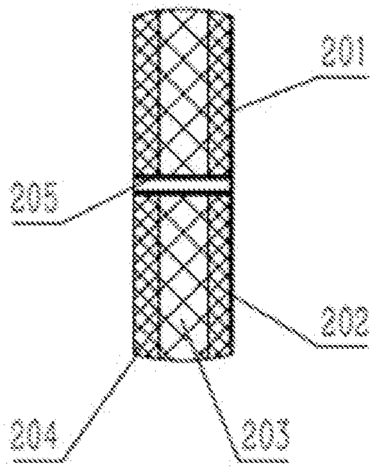
FIG. 4*e* is a schematic diagram of an enlarged structure of a part C in FIG. 4*d*.
Figure 5A:
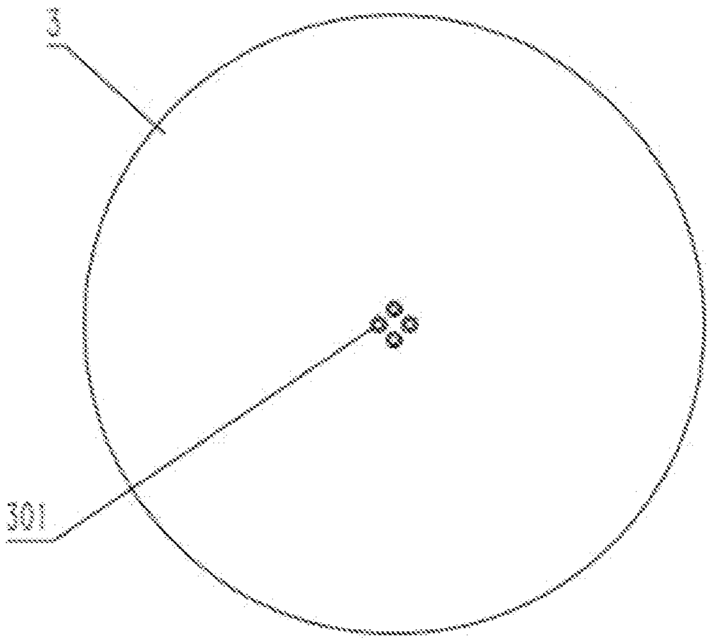
FIGS. 5*a* to 5*d* are schematic structural diagrams of a metal backplate in a polarized antenna according to an embodiment of the present disclosure.
Figure 5B:
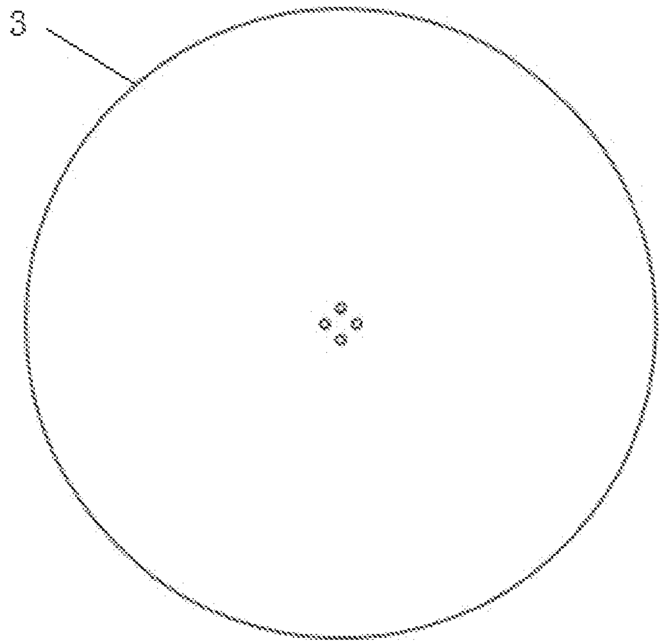
Figure 5C:
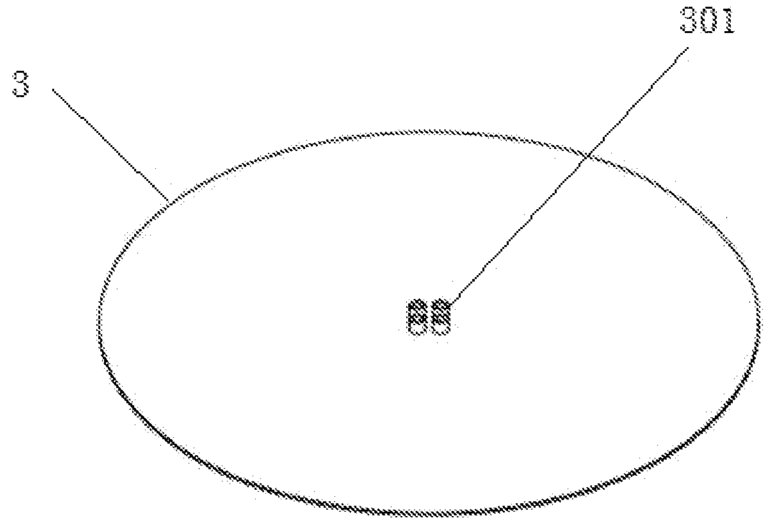
Figure 5D:
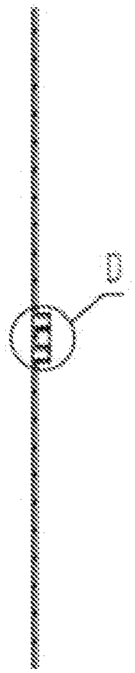
Figure 5E:
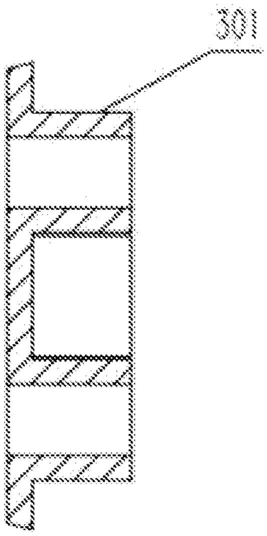
FIG. 5*e* is a schematic diagram of an enlarged structure of a part D in FIG. 5*d*.

In some embodiments, as shown in FIGS. 5*a* to 5*e*, four annular support columns 301 are formed at positions, close to the center, of the metal backplate 3, and the annular support columns 301 are configured to support the circularly polarized patch 1 after penetrating the composite dielectric high-impedance surface array 2. As shown in FIGS. 2*a* to 2*b*, the annular support columns 301 may pass through the circular holes 206 correspondingly and be connected with the patch medium layer 106 to play a role of structural support. The circularly polarized patch 1 is fed by the coaxial feeding lines 105, and the coaxial feeding lines 105 penetrate the antenna dielectric layer 106 and the annular support columns 301 to extend to the outside of the annular support columns 301.

Figure 7:
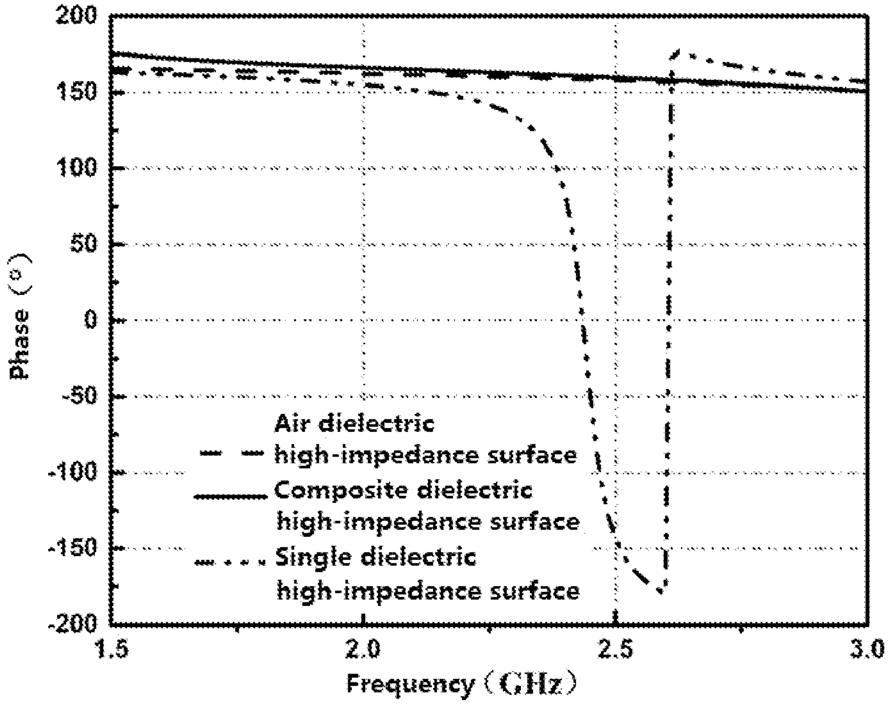
FIG. 7 shows phase characteristic curves of a composite dielectric high-impedance surface unit and other different dielectric high-impedance surface units in an embodiment of the present disclosure.

FIG. 7 shows phase characteristic curves of a composite dielectric high-impedance surface after optimized design and other different dielectric high-impedance surface units. It may be found that the phase characteristics of an air dielectric high-impedance surface are the most stable, but an air dielectric cannot be directly used due to requirements for the mechanical characteristics of the structure in actual use. The phase characteristics of a single dielectric high-impedance surface are the most fluctuating, which directly affects a gain effect of the antenna. The phase characteristics of the composite dielectric high-impedance surface in the present disclosure are close to those of the phase characteristics of the air dielectric high-impedance surface, so that the antenna has relatively stable gain characteristics in an operating frequency band.

Figure 8:
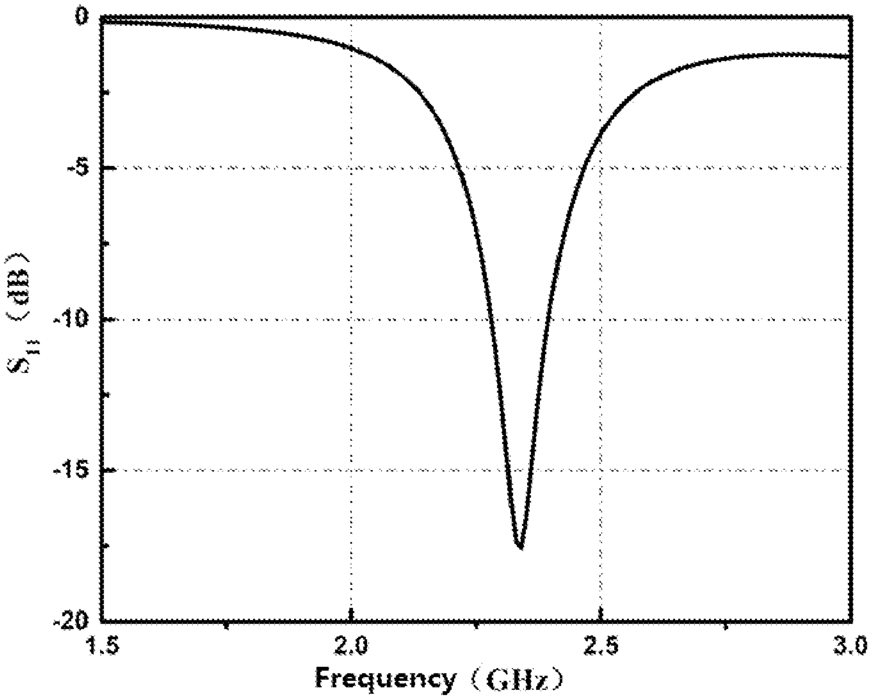
FIG. 8 is an S11 characteristic curve of a high-gain low-profile circularly polarized antenna according to an embodiment of the present disclosure.
Figure 9:
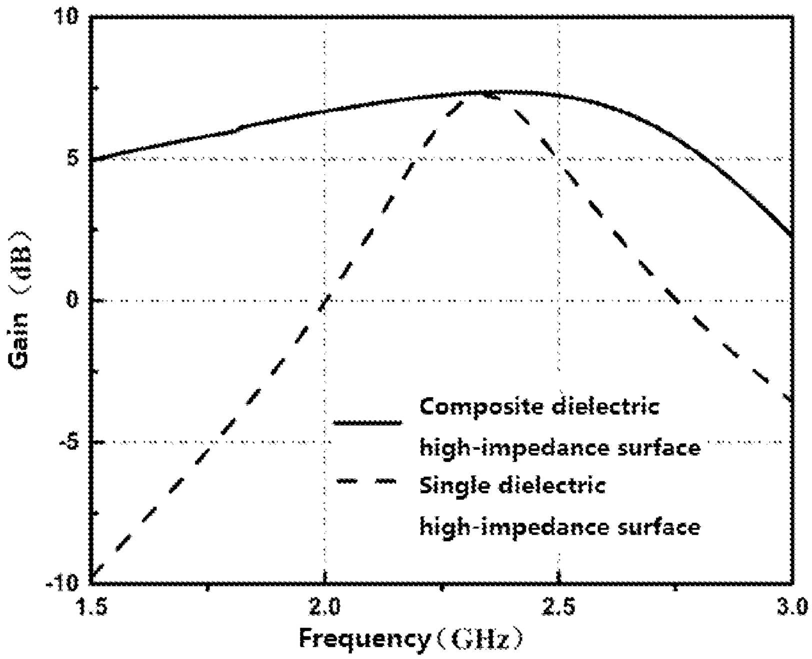
FIG. 9 is a gain characteristic curve of a high-gain low-profile circularly polarized antenna according to an embodiment of the present disclosure.
Figure 10:
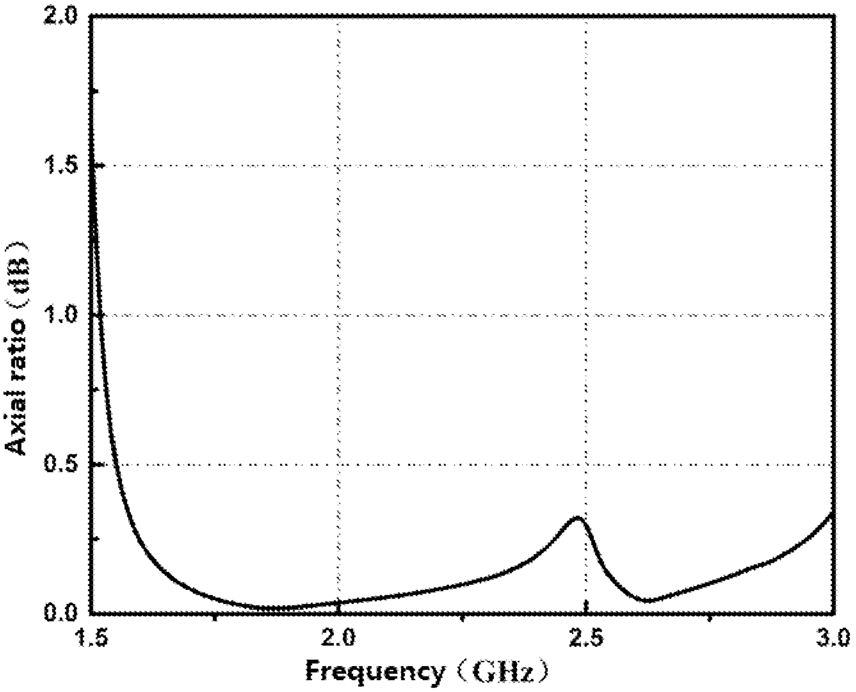
FIG. 10 is an axial ratio characteristic curve of a high-gain low-profile circularly polarized antenna according to an embodiment of the present disclosure.

FIG. 8 shows an S11 parameter of a high-gain low-profile circularly polarized antenna after optimized design. It may be found that the antenna operates near 2.35 GHz with a bandwidth of about 120 MHz. FIG. 9 shows a gain characteristic curve of a high-gain low-profile circularly polarized antenna after optimized design. It may be found that the antenna has more stable gain characteristics in the operating frequency band than the antenna with the single dielectric high-impedance surface. FIG. 10 shows an axial ratio characteristic curve of a high-gain low-profile circularly polarized antenna after optimized design. The antenna has good circularly polarized radiation capability in the operating frequency band.

A working principle is as follows.

When a dielectric constant of the dielectric layer is relatively low, a phase change of the high-impedance surface array in the operating frequency band is relatively small, and when the dielectric constant of the dielectric layer is relatively high, the phase change of the high-impedance surface array in the operating frequency band is relatively large. Theoretically, when vacuum is used as the dielectric, a phase characteristic of the high-impedance surface array is the most stable. However, this is not realistic in practice. In this regard, some embodiments of the present disclosure adopt a composite dielectric structure in which high and low dielectric constants are alternately stacked. The analysis in FIG. 7 shows that the structure does have stable phase characteristics, so that the antenna gain does not fluctuate greatly in the operating frequency band. Therefore, the antenna in the present disclosure also has stable gain characteristics while having a low profile.

In addition, a pair of orthogonal signals with constant amplitude and a phase difference of 90° are required to achieve the circularly polarized radiation. In this regard, four fan-shaped patches are used as radiation units, and phase feeds at 0°, 90°, 180° and 270° are sequentially performed through the coaxial lines, as shown in FIGS. 3*a* to 3*e*. The two opposite fan-shaped patches may be regarded as a set of dipole antennas. Therefore, there are two sets of dipole antennas in the whole antenna structure. The two antennas have the characteristics of orthogonality, constant amplitude, and the phase difference of 90°, resulting in circularly polarized radiation.

What is claimed is:

1. A high-gain low-profile circularly polarized antenna, comprising a circularly polarized patch at a top, a composite dielectric high-impedance surface array in a middle, and a metal backplate at a bottom; wherein the circularly polarized patch comprises a patch dielectric layer, wherein a first fan-shaped patch, a second fan-shaped patch, a third fan-shaped patch, and a fourth fan-shaped patch are formed on an upper surface of the patch dielectric layer, and the first fan-shaped patch, the second fan-shaped patch, the third fan-shaped patch, and the fourth fan-shaped patch are not in contact with each other; four coaxial feeding lines are arranged at positions that are close to a center of the patch dielectric layer, each of the coaxial feeding lines is vertically arranged, an upper end of the each of the coaxial feeding lines is electrically connected to one corresponding fan-shaped patch of the a first fan-shaped patch, a second fan-shaped patch, a third fan-shaped patch, and a fourth fan-shaped patch, and the other end of the each of the coaxial feeding lines penetrates the patch dielectric layer to extend to an outside of a lower surface of the patch dielectric layer.

2. The high-gain low-profile circularly polarized antenna according to claim 1, wherein the composite dielectric high-impedance surface array comprises a composite dielectric layer, a plurality of circular metal patches located on an upper surface of the composite dielectric layer and a plurality of plated through holes, wherein four circular holes are formed in positions that are close to a center of the composite dielectric layer, and the four circular holes penetrate the composite dielectric layer; and each of the plurality of circular metal patches corresponds to one plated through hole of the plated through holes, an upper end of each of the plated through holes is connected to a corresponding circular metal patch of the circular metal patches, and a lower end of the each of the plated through holes is connected to the metal backplate after passing through the composite dielectric layer.

3. The high-gain low-profile circularly polarized antenna according to claim 2, wherein the composite dielectric layer comprises a third dielectric material layer at a lower side, a second dielectric material layer in a middle, and a first dielectric material layer at an upper side.

4. The high-gain low-profile circularly polarized antenna according to claim 2, wherein the each of the circular metal patches, a part of the composite dielectric layer at a lower side of the each of the circular metal patches, a part of the metal backplate at a lower side of the composite dielectric layer, and the plated through hole constitute one composite dielectric high-impedance surface unit; a number of the composite dielectric high-impedance surface unit is multiple, and a third dielectric material layer is formed on an upper surface of the metal backplate, a second dielectric material layer is formed on an upper surface of the third dielectric material layer, a first dielectric material layer is formed on an upper surface of the second dielectric material layer, the circular metal patches are formed on an upper surface of the first dielectric material layer, and the each of the circular metal patches and the metal backplate are interconnected through a corresponding plated through hole of the plated through holes penetrating the first dielectric material layer, the second dielectric material layer, and the third dielectric material layer.

5. The high-gain low-profile circularly polarized antenna according to claim 4, wherein a diameter of the each of the circular metal patches in each composite dielectric high-impedance surface unit is less than a diameter of the first dielectric material layer, and diameters of the metal backplate, the first dielectric material layer, the second dielectric material layer, and the third dielectric material layer in the each composite dielectric high-impedance surface unit are equal.

6. The high-gain low-profile circularly polarized antenna according to claim 2, wherein the composite dielectric layer comprises more than four dielectric material layers.

7. The high-gain low-profile circularly polarized antenna according to claim 4, wherein four annular support columns are formed at positions, close to the center, of the metal backplate, and the annular support columns are configured to support the circularly polarized patch after penetrating the composite dielectric high-impedance surface array.

8. The high-gain low-profile circularly polarized antenna according to claim 2, wherein a whole composite dielectric high-impedance surface unit is in a shape of a cylinder or triangular prism.

9. The high-gain low-profile circularly polarized antenna according to claim 1, wherein the circularly polarized patch is triangular or circular.

10. A high-gain low-profile circularly polarized antenna, comprising a circularly polarized patch at a top, a composite dielectric high-impedance surface array in a middle, and a metal backplate at a bottom; wherein the composite dielectric high-impedance surface array comprises a composite dielectric layer, a plurality of circular metal patches located on an upper surface of the composite dielectric layer and a plurality of plated through holes, wherein four circular holes are formed in positions that are close to a center of the composite dielectric layer, and the four circular holes penetrate the composite dielectric layer; and each of the plurality of circular metal patches corresponds to one plated through hole of the plated through holes, an upper end of each of the plated through holes is connected to a corresponding circular metal patch of the circular metal patches, and a lower end of the each of the plated through holes is connected to the metal backplate after passing through the composite dielectric layer.

* * * * *